(12) United States Patent
Shaapur et al.

(10) Patent No.: US 10,482,473 B2
(45) Date of Patent: Nov. 19, 2019

(54) METHOD FOR FORENSIC ANALYSIS OF ELECTRONIC COMPONENTS

(71) Applicant: FabMetrix Inc., Scottsdale, AZ (US)

(72) Inventors: Frederick F. Shaapur, Scottsdale, AZ (US); Roger J. Graham, Scottsdale, AZ (US)

( * ) Notice: Subject to any disclaimer, the term of this patent is extended or adjusted under 35 U.S.C. 154(b) by 0 days.

(21) Appl. No.: 15/588,016

(22) Filed: May 5, 2017

(65) Prior Publication Data

US 2017/0330201 A1 Nov. 16, 2017

Related U.S. Application Data

(60) Provisional application No. 62/335,221, filed on May 12, 2016.

(51) Int. Cl.
| | | |
|---|---|---|
| *G06F 17/50* | (2006.01) | |
| *G06Q 30/00* | (2012.01) | |
| *G06F 21/85* | (2013.01) | |
| *G06F 21/44* | (2013.01) | |
| *G06F 21/73* | (2013.01) | |

(52) U.S. Cl.
CPC ......... *G06Q 30/0185* (2013.01); *G06F 21/44* (2013.01); *G06F 21/73* (2013.01); *G06F 21/85* (2013.01)

(58) Field of Classification Search
USPC .......... 716/100–106, 126–139; 382/100–107
See application file for complete search history.

(56) References Cited

U.S. PATENT DOCUMENTS

| | | |
|---|---|---|
| 7,877,712 B2 | 1/2011 | Anderson et al. |
| 9,224,196 B2 | 12/2015 | Duerksen et al. |
| 2008/0282209 A1 | 11/2008 | Anderson et al. |
| 2011/0096955 A1* | 4/2011 | Voloshynovskiy ...... G06K 9/00 382/103 |
| 2014/0169617 A1* | 6/2014 | Pollard .............. H04N 1/32101 382/100 |
| 2015/0219714 A1 | 8/2015 | Hamilton et al. |
| 2015/0370247 A1 | 12/2015 | Newell et al. |

OTHER PUBLICATIONS

Guin et al, "Counterfeit Integrated Circuits: A Rising Threat in the Global Semiconductor Supply Chain," Proceedings of the IEEE, vol. 102, No. 8, pp. 1207-1228, 2014.

Huang et al, "Electronic Counterfeit Detection Based on the Measurement of Electromagnetic Fingerprint," Microelectronics Reliability, vol. 55, No. 9-10, pp. 2050-2054, 2015.

B. Sood and D. Das, "Screening for Counterfeit Electronic Parts," Proceedings of 2011 IPC APEX EXPO, pp. 2065-2077, Las Vegas, NV, Apr. 10-14, 2011.

(Continued)

*Primary Examiner* — Binh C Tat
(74) *Attorney, Agent, or Firm* — Stanzione & Associates, PLLC; Patrick Stanzione

(57) ABSTRACT

A physical inspection forensic methodology with an inherent reliable fallback option based on the extraction of quantifiable intrinsic manufacturer-specific process signatures present superficially and/or within the electronic component. The methodology will seek to extract such signatures cost-effectively through a tiered application of the most expedited and least intrusive approaches.

11 Claims, 5 Drawing Sheets

(56) References Cited

OTHER PUBLICATIONS

M. Pecht and S. Tiku, "Bogus: Electronic Manufacturing and Consumers Confront a Rising Tide of Counterfeit Electronics," IEEE Spectrum, vol. 43, No. 5, pp. 37-46, 2006.
F. McFadden and R. Arnold, "Supply Chain Risk Mitigation for IT Electronics," Proceedings of 2010 IEEE International Conference on Technologies for Homeland Security, pp. 49-55, Waltham, MA, Nov. 8-10, 2010.

* cited by examiner

METHOD FOR FORENSIC ANALYSIS OF ELECTRONIC COMPONENTS

REFERENCE TO RELATED APPLICATIONS

This application claims one or more inventions which were disclosed in Provisional Application No. 62/335,221, filed May 12, 2016, entitled "RAPID AND RELIABLE FORENSIC ANALYSIS OF ELECTRONIC COMPONENTS". The benefit under 35 USC § 119(e) of the United States provisional application is hereby claimed, and the aforementioned application is hereby incorporated herein by reference.

ACKNOWLEDGMENT OF GOVERNMENT SUPPORT

This invention was made with Government support under Air Force SBIR Contract No. FA8650-10-C-1739, and Defense Advanced Research Projects Agency SBIR Contract No. W911NF-14-C-0040. The government has certain rights in the invention.

BACKGROUND OF THE INVENTION

Field of the Invention

The invention pertains to the field of electronic components. More particularly, the invention pertains to detection of counterfeit components.

Description of Related Art

The presence of counterfeit electronic components in the supply chain poses a serious threat to mission-critical applications in military, aerospace, medical, automotive and other fields. As the influx of such parts continues to accelerate, the imposed risk arising from their utilization is increasing at a fast rate. Despite the availability of various countermeasures for mitigation of this threat through detection of counterfeit electronic components, an optimal solution entailing a cost-effective, high-confidence and high-throughput methodology is still to be developed and made available for this purpose.

Current counterfeit detection methods based on physical inspections rely on the examination of the exterior of a component or on methods that entail direct analysis of the die located within the component. The results of these examinations and analyses of a known authentic reference part and a suspect part are generally compared with one another to determine whether or not the suspect part is counterfeit. An external examination of the component has the advantage of being generally non-destructive but is potentially limited in reliability, given that the manufacturing origin of the peripheral parts of the component, e.g. the packaging, lead frame, etc. may be different from that of the internal die.

It is generally accepted that there is a wide range of definitions and classifications for counterfeit electronic components and their respective and recommended detection methodologies. FIG. 2 and FIG. 3 show a full taxonomy for the above components and methodologies, respectively. Although the method of the invention is directly or indirectly relevant and applicable to the majority of the specified component categories in FIG. 2, this application will present an embodiment particularly applicable to the detection of illegally "cloned" components.

Therefore, as per this distinction, a counterfeit component is defined as "an unauthorized copy of the original part manufactured without the knowledge and/or consent of the original component manufacturers (OCM)." For the sake of this discussion, we then refer to all other categories of components shown in FIG. 1 as "fraudulent" components.

Guin et al, "Counterfeit Integrated Circuits: A Rising Threat in the Global Semiconductor Supply Chain," Proceedings of the IEEE, vol. 102, no. 8, pp. 1207-1228, 2014, provides a comprehensive overview of the current state of the art regarding the available detection and prevention solutions concerning the counterfeit electronic parts. This reference also provides thorough taxonomies of the relevant components and utilized methodologies. The conclusions reached by the authors generally indicate that the currently available solutions are rather inadequate in all three aspects of: results reliability, process turnaround time, and their cost effectiveness.

Huang et al, "Electronic Counterfeit Detection Based on the Measurement of Electromagnetic Fingerprint," Microelectronics Reliability, vol. 55, no. 9-10, pp. 2050-2054, 2015, describes a method called "Z-score" (also called the "standard score") for comparing electromagnetic fingerprints.

Other groups investigating the prowess of the same solutions have reached similar conclusions. For example, see:

B. Sood and D. Das, "Screening for Counterfeit Electronic Parts," Proceedings of 2011 IPC APEX EXPO, pp. 2065-2077, Las Vegas, Nev., Apr. 10-14, 2011

M. Pecht and S. Tiku, "Bogus: Electronic Manufacturing and Consumers Confront a Rising Tide of Counterfeit Electronics," IEEE Spectrum, vol. 43, no. 5, pp. 37-46, 2006

F. McFadden and R. Arnold, "Supply Chain Risk Mitigation for IT Electronics," Proceedings of 2010 IEEE International Conference on Technologies for Homeland Security, pp. 49-55, Waltham, Mass., Nov. 8-10, 2010

U.S. Pat. No. 7,877,712, entitled "System for and method of verifying IC authenticity" shows a system which takes advantage of process variation in every integrated circuit (IC). Process variation creates a unique signature or "silicon fingerprint" associated with each IC. Since manufacturing processes vary (albeit slightly) for each die on a wafer, no two die have the same silicon fingerprint.

U.S. Pat. No. 9,224,196, entitled "System and Method for Authentication", shows a method of utilizing complex component package marking tags and identifiers.

US Published Application 2015/0219714, entitled "Counterfeit microelectronics detection based on capacitive and inductive signatures" teaches that systems can be based solely on acquisition of input/output (I/O) pin current-to-voltage (IV) curves that are compared to a "Golden Device" database. A common problem with these simple methods of acquisition and comparison is that they are generally not good at accounting for normal manufacturing process variations which can vary with manufacturer processes and foundries.

SUMMARY OF THE INVENTION

The invention presents a physical inspection forensic methodology with an inherent reliable fallback option based on the extraction of quantifiable intrinsic manufacturer-specific process signatures present superficially and/or within the electronic component. The methodology will seek to extract such signatures cost-effectively through a tiered application of the most expedited and least intrusive approaches.

This technology has the potential to detect the most challenging types of counterfeit electronic components effectively and efficiently by providing a high level of confidence in its detection rate through forensic analysis, combined with an expedited turnaround time in its implementation. Such a capability will have immediate applications for its respective purpose within the defense, intelligence and various commercial communities such as medical, aerospace, automotive, etc.

DETAILED DESCRIPTION OF THE INVENTION

The availability of a highly reliable counterfeit electronic component detection methodology, which can be utilized at a reasonable cost with an acceptable turnaround time, will be of intense interest to the defense, intelligence and a myriad of other communities with critical applications for semiconductor device products. Given the escalating scope and level of sophistication of counterfeiting at this time, it is imperative to maintain a broad view of any promising concept and approach, which may not only augment currently employed strategies for detection of counterfeit electronic components but also provide a new disruptive solution. While these conclusions may apply to a range of components, we shall make counterfeit detection of Integrated Circuit (IC) components the focus of this application, although the proposed approach is potentially extendable to other electronic component types.

Figure 1:
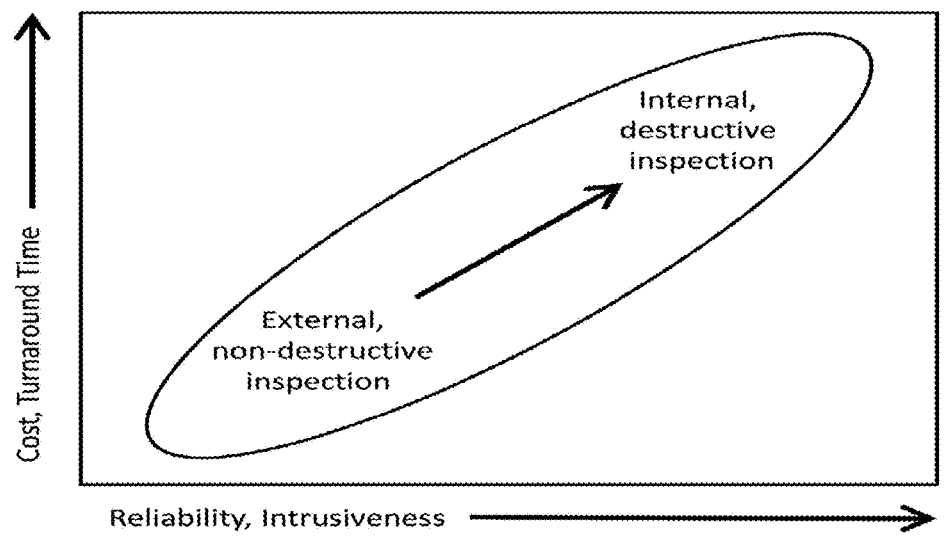
FIG. 1 shows the relationship between counterfeit detection requirements and external versus internal physical inspection techniques.
Figure 2:
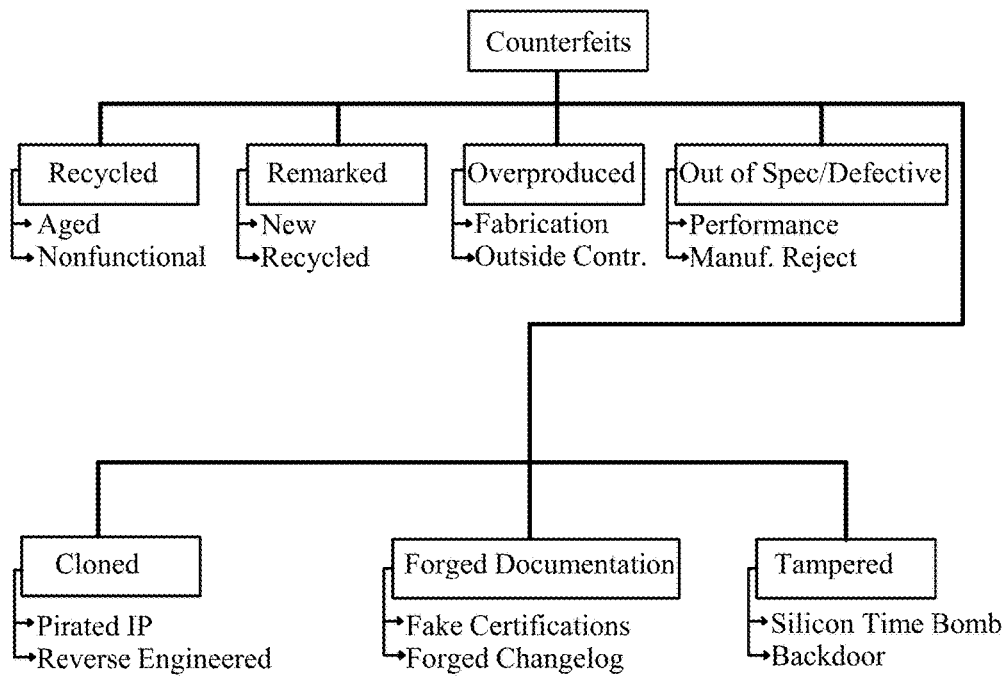
FIG. 2 shows a taxonomy of counterfeit electronic components.
Figure 3:
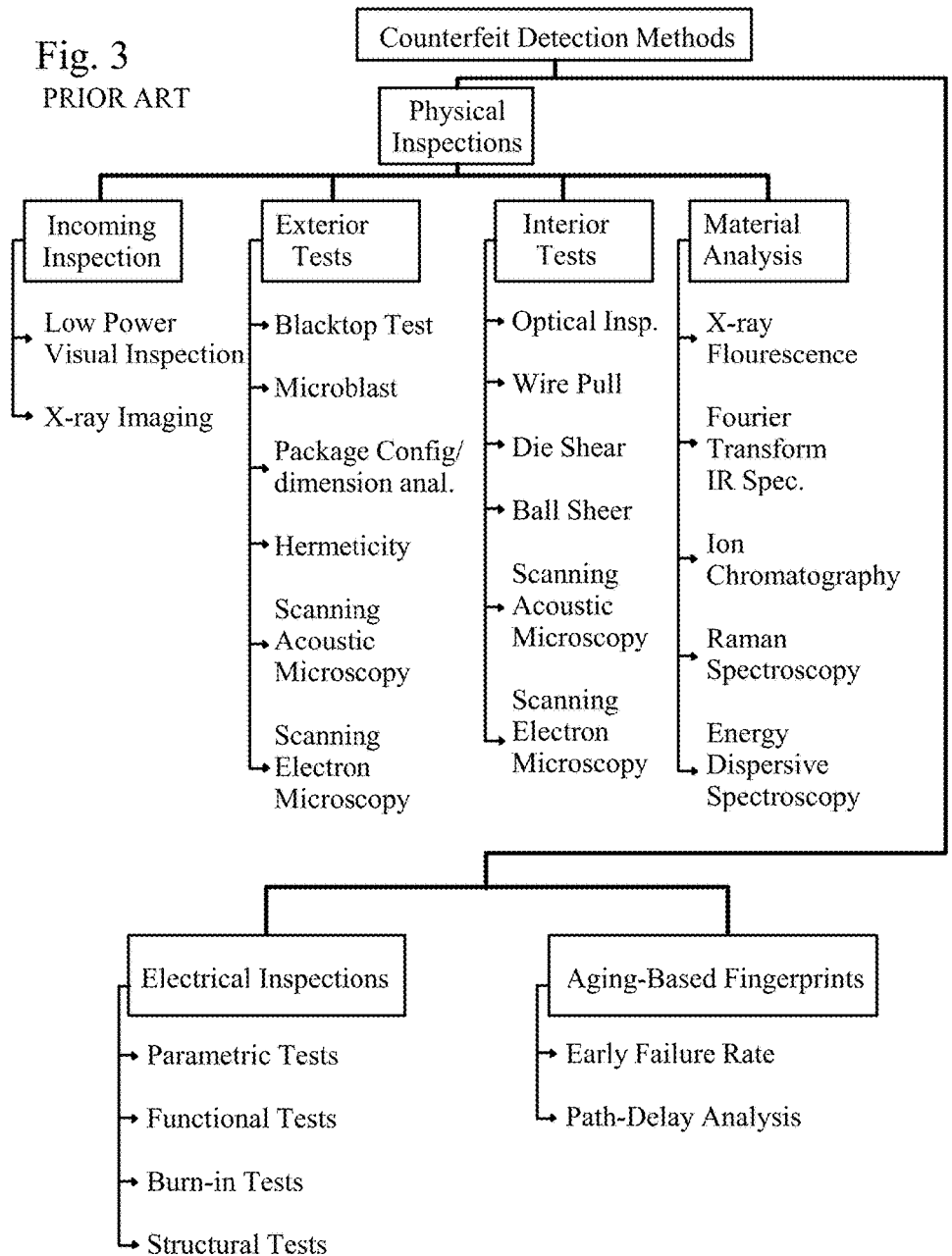
FIG. 3 shows a taxonomy of prior art counterfeit detection methods.

An internal physical inspection of the electronic component involves intrusive methods that allow analysis of the die within through a de-lidding step and so has the disadvantage of being destructive in nature. However, this approach can potentially reliably connect the physical characteristics of the component with its original component manufacturer (OCM) because it entails a physical analysis of the actual die and its immediate periphery. Given the escalating level of sophistication of electronic component counterfeiting, a more sophisticated level of approach to counterfeit detection by physical means is needed. Such a solution needs to balance the competing requirements of reliability, cost, turnaround time and intrusiveness as implied above and illustrated in FIG. 1.

One such approach, untried as far as we are aware, is the systematic implementation of tiered physical inspections, ranging in complexity and intrusiveness from light optical microscopy (LOM) based examination of the exterior of the electronic component to scanning electron microscopy (SEM) and transmission electron microscopy (TEM)-based analysis at a much more granular level to exploit the built-in 'fabrication hallmarks' of the die within. This application presents a tiered physical inspection forensic methodology based on the extraction of such intrinsic manufacturer-specific process signatures manifested as quantifiable, statistically-validated structural details present superficially and/or within the electronic component. The process signatures of the authentic part can then be compared with the same ones of the suspect part to assess its authenticity.

Based on the results obtained to date, with a three sigma confidence level (99.7%), this technology has been able to extract fab-specific manufacture process signatures from the internal structure of the die of the electronic component under investigation. It must be noted that the extracted and utilized process signatures for this determination are fab-specific versus manufacturer-specific, implying that the prowess of this forensic capability exceeds that required for the authentication of an electronic component fabricated by a specific manufacturer.

However, due to its invasiveness and complexity, this level of inspection will be regarded the one of final resort, albeit likely the most reliable one, in a tiered set of inspection methods for counterfeit detection. Therefore, the proposed approach will seek to extract intrinsic manufacturer-specific process signatures from various parts of the electronic component through the application of a range of physical inspection techniques that are tiered in their deployment to balance the demands of cost-effectiveness, reliability and turnaround.

The inventors have observed the presence of intrinsic nanostructural manufacturing process signatures within electronic components. These signatures were observed within the Back End of Line (BEOL) multilayer interconnects physical structure of the electronic components analyzed via Cross-sectional Scanning Electron Microscopy (XSEM) and High-Resolution Cross-sectional Transmission Electron Microscopy (HR-XTEM) and their complementary compositional materials analysis techniques, including X-ray Energy Dispersive Spectroscopy (XEDS), Surface Compositional Analysis Spectroscopy (SCAS) and Electron Energy Loss Spectroscopy (EELS). Furthermore, we also noticed manufacturer-specific intrinsic process signatures while analyzing the respective transistor structures in transverse cross sections. In this work, we carried out detailed statistical analysis to investigate and confirmed the systematic presence of a subset of these signatures.

The manufacturer-specific process signatures that we wish to exploit in our forensic counterfeit detection approach are imparted to the structural details of the component through the parameters of the numerous fabrication steps implemented by the manufacturer. They are therefore intrinsic to it, unlike extrinsic signatures that may be deliberately introduced if, for example, an embedded physical 'watermarking' fabrication scheme has been implemented during fabrication. Therefore they are present in electronic components already circulating in the supply chain that do not contain any specially introduced markers of authenticity. It is worth noting that these watermarking schemes themselves have the potential to be copied, depending on the level of sophistication of the counterfeiter, but that a plurality of intrinsic fabrication process signatures will be much harder to replicate.

We divide manufacturer specific process signatures into two groups, namely Quantifiable, Statistically-validated, Nanostructural (QSN) Signatures and Quantifiable, Statistically-validated, General (QSG) Signatures, which are defined in the following two sub-sections. The respective statistical validation strictness is specified by the user of method depending on his required level of statistical certainty of the forensic analysis.

The inventors have incidentally observed and statistically validated the presence of intrinsic manufacturer-specific signatures manifested as observable nanostructural details of selected features in a variety of electronic components. These signatures have been generally observed via HR-XTEM imaging of the interior of the die.

Figure 4:
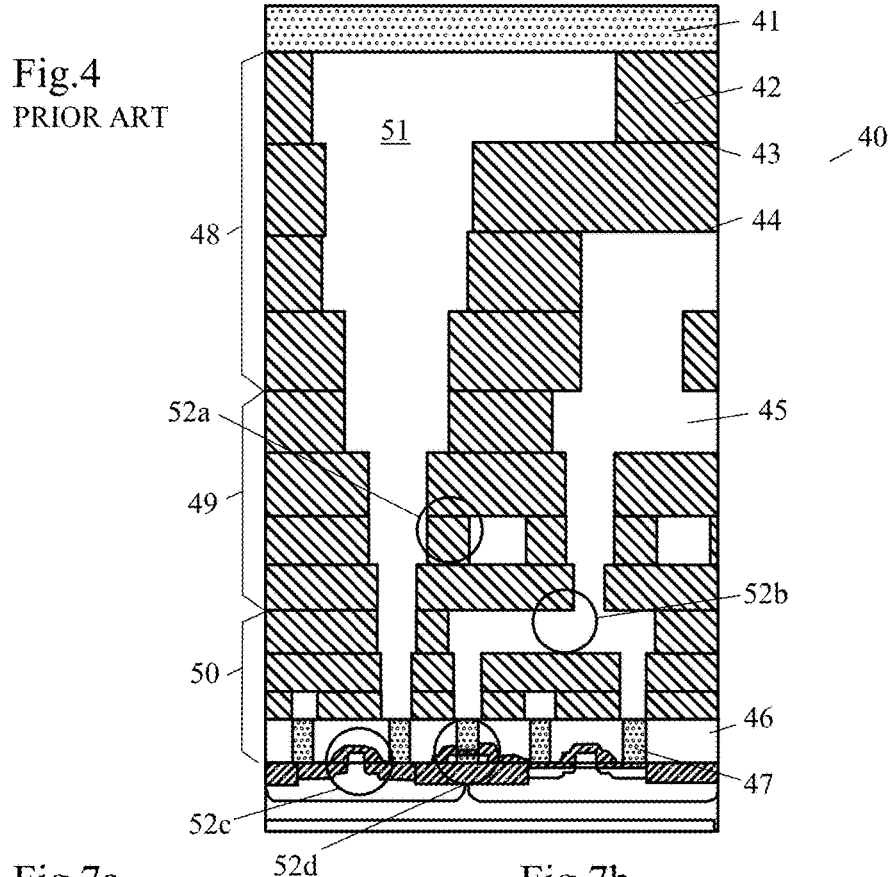
FIG. 4 shows a cross-section of a typical CMOS device.

FIG. 4 shows schematically a typical cross-section of a modern logic IC chip, featuring a complementary metal-oxide-semiconductor (CMOS) device 40 with p-channel and n-channel transistors and an advanced interconnect scheme.

In the example of FIG. 4, the layers represent passivation 41, dielectric 42, an etch stop layer 43, a dielectric diffusion barrier 44, a copper conductor with metal barrier liner 45, pre-metal dielectric 46, a tungsten contact plug 47 and wire via 51. The chip can be divided up into sections denoted as Global 48, Intermediate 49 and Local 50.

The circles 52a-52d which are superimposed on the diagram denote some representative locations and features from which we have been able to extract distinct intrinsic nanostructural process signatures related to the fabrication facility of origin of the electronic component under investigation.

Subsequently, these forensic signatures were validated as representative of their respective fabs with three-sigma (99.7%) confidence level. These signatures are extracted through measurements made from intended and anomalous nanostructural details present in selected and representative locations of the device as mentioned above.

The measurement data are taken from different locations on the same and different dies, which allows a statistical analysis and validation to be made through the coefficient of variation (CV), also known as relative standard deviation (RSD), that is used to assess the presence of a usable signature. As was mentioned above, the respective statistical validation strictness is specified by the user of method depending on his required level of statistical certainty of the forensic analysis.

It should be noted that QSN signatures are generated without the restriction to collect data from exactly the same location on each device in the authentic subject group. Furthermore, QSN signatures can be product-independent within their respective technology node of an OCM. Therefore, only one set of known authentic reference components is required for extraction of such signatures from the entire family of parts manufactured by a given OCM using the respective process technology node. As was mentioned earlier, these signatures have been generally extracted via HR-XTEM imaging; however, the required resolution in some cases overlaps with those available through a modern SEM, thus potentially simplifying the QSN signature extraction process.

As a reminder, this forensic capability exceeds the requirement for detection of a counterfeit electronic component in that it can differentiate between the specific fabrication facilities within the OCM operations from where the component under investigation has originated. To date, the applicant's development of a TEM-based forensic methodology to determine fab-of-origin for DARPA has necessitated implementation of a stringent analysis protocol to extract valid and meaningful QSN signatures. This condition is required to reveal the most subtle nanostructural variations between candidate components under analysis (manufactured by the same OCM) with a high degree of statistical certainty. However, it is reasonable to expect that some of these exacting requirements can be relaxed if QSN signatures are used in counterfeit detection where different OCMs are involved, therefore simplifying the process.

By extension from the detected QSN signatures described previously, it can be expected that intrinsic manufacturer-specific signatures may also be present in an electronic component at a much less granular level. Such signatures could be extracted from a variety of larger features either present on the die itself or from the materials and structures that comprise the electrical connections and packaging, and we define these as quantifiable, statistically-validated, general (QSG) signatures. The source of such signatures may include but not be limited to the nature of the packaging material, its markings and critical dimensions, lead frame structural details, the microstructure and composition of connectors, and critical dimensions, markings, composition and layout of global interconnect features on the surface of the die.

Unlike QSN signatures, some QSG signatures could be extracted by non-destructive analysis of the component using techniques such as Light Optical Microscopy (LOM), Scanning Electron Microscopy (SEM), X-Ray Imaging (XRI) and X-ray Energy Dispersive Spectroscopy (XEDS) that offer some degree of spatial resolution. The exact sources of the QSG signatures, while not yet known, could be determined using the same methodology that we developed to successfully determine the source of QSN signatures. That is, through the exploratory application of analytical techniques such as those mentioned above and statistical validation of the resulting data, potential QSG signatures could be extracted and ranked by CV.

The most efficient method for determining usable QSG and QSN signatures is to employ a tiered analytical approach to their extraction, starting with the easiest technique and finishing with the most complex to implement. This follows the logical inspection sequence of starting with the least intrusive (non-destructive) methods that examine the exterior of the component and finish with the most intrusive (destructive) that examine the die itself. If a given tier of analysis does not extract a usable signature, or extracts one that may have limited reliability (i.e. shows poor CV), then the inspection analysis in next tier is undertaken and so on until viable signatures are extracted. If several signatures are generated for a given tier, they may be ranked for reliability based on their CV.

This process is applied to a set of authentic parts of the same type and once the signatures are generated they are available for comparison with the equivalent signatures from a suspect component to assess its authenticity. After the signatures for the authentic component are known and ranked through application of the above process, the same signatures are extracted from the suspect part and compared with the authentic set to determine whether or not they are similar. In this way, the comparison is accomplished in the most efficient way and makes use of the least invasive inspection techniques that can do the job. Based on their description above, QSG signatures may be extracted by the lower tiered inspection methods while, if necessary, QSN signatures will be extracted by the analysis methods at the top of the tiered inspection process. It should be acknowledged that since the outcome of extracting lower tier QSG signatures through non-intrusive techniques is unknown, it might be necessary to generate reliable QSG or QSN signatures by intrusive techniques.

Furthermore, in cases where no reliable QSG signatures can be determined, reliable QSN signatures can nevertheless be extracted to distinguish between authentic and counterfeit parts of the same type.

Some of the structural features from which QSG signatures might be extracted may be identified through a thorough literature review. Significantly, however, others may need to be determined by examination and exploration of the components, drawing on the insight gained through our experience identifying fab-specific QSN signatures. The potential sources of these features include those present on the exterior of the component and well as those observable on the die itself, after a de-lidding process physically exposes it. The sources of such signatures may include but not be limited to the nature of the packaging material, its markings and critical dimensions, lead frame structural details, the microstructure and composition of connectors, and critical dimensions, markings, composition and layout of global interconnect features on the surface of the die.

Once the potential QSG and QSN signature-yielding structural features and the required analysis techniques are identified, the hierarchy of the respective analyses can be established. These analyses will be applied in a tiered methodology in order based on the complexity and invasiveness of the technique and will therefore be logically implemented starting with external analysis following through to an internal analysis of the component, as appropriate.

A possible tiered forensic analysis scheme based on the above principles is summarized in Table 1, below, which shows an example of a tiered forensic analysis scheme used to extract manufacturer QSG and QSN signatures.

Techniques in this table are listed increasing in tier from top to bottom. Non-intrusive techniques are shown in the region surrounded by heavy lines, while more intrusive and complex techniques that involve direct access to the die are shown in the region surrounded by double lines.

set against which the corresponding signatures from the suspect part will be compared forensically to determine its authenticity.

The above procedural framework is schematically shown below through a process flow chart in FIG. 5. As can be seen in the figure, the method comprises the following steps:

Step 10: Determine the desired level of reliability, to determine the starting level of signature extraction to be used. The levels are discussed above with respect to Table 1, and increasing level numbers increase the level of intrusiveness and difficulty in extracting the signatures to be used in the forensic analysis.

Figure 5:
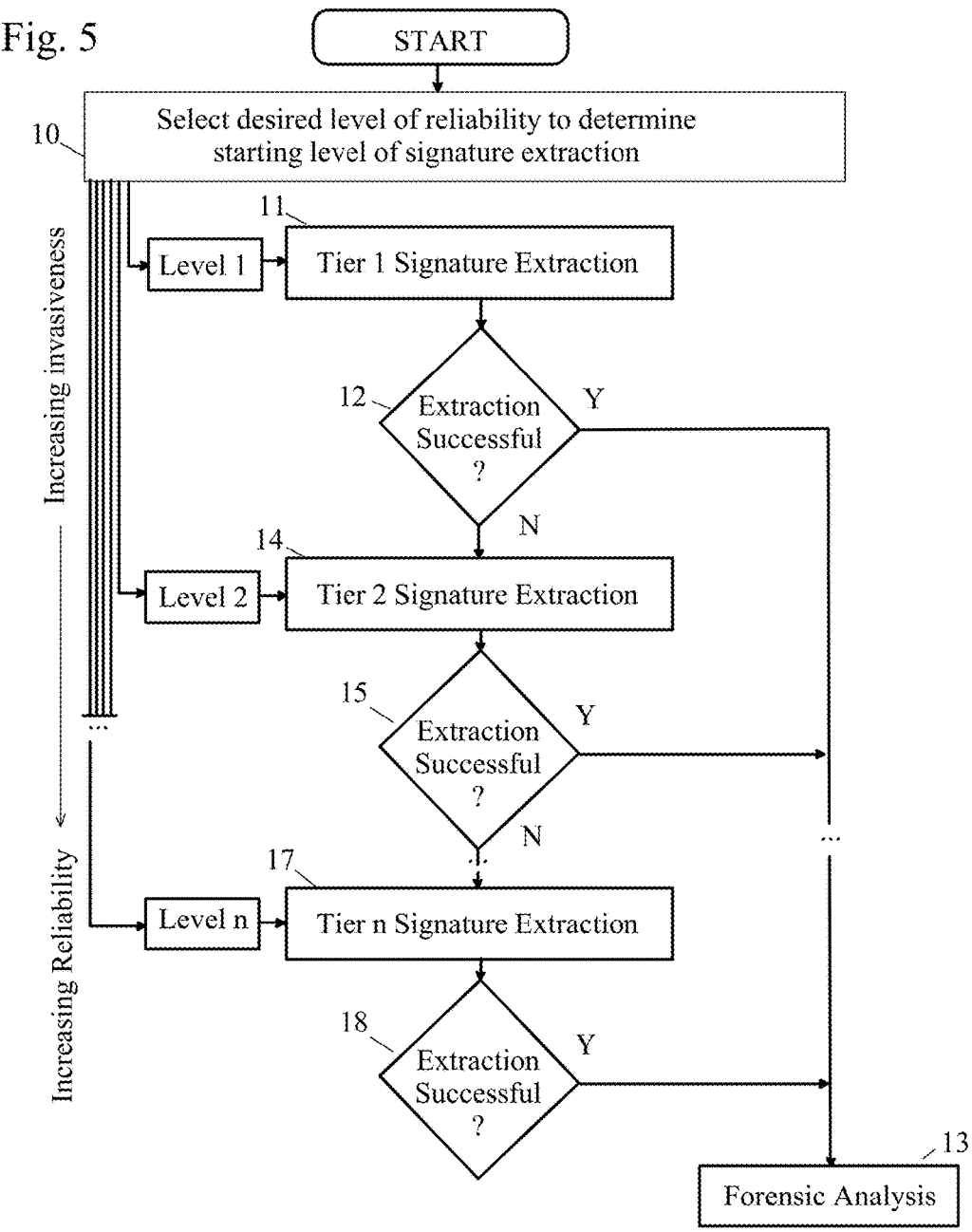
FIG. 5 shows a flowchart of a manufacturer-specific signature extraction and forensic analysis process.

Three tiers or levels are shown in the flowchart of FIG. 5, levels 1, 2 . . . n. It will be understood that the number of levels will depend upon the nature of the components and the desired levels of reliability in a given application.

As shown in FIG. 5, once the starting level is chosen in step 10, the method proceeds to the chosen level to begin the method. For the purposes of this discussion, we will assume that level 1 is chosen.

If not, If not successful, the above iterative process continues until a QSG or QSN signature is successfully extracted at the n-th attempt (also known as tier-n signature extraction attempt) and used for the intended counterfeit detection forensic analysis.

Step 11: Attempt a Tier-1 Signature Extraction: start with the first attempt at extracting a QSG signature (also known as tier-1 signature extraction attempt) using a non-intrusive technique, including those specified as "exterior" in Table I.

Step 12: Was the Extraction Successful? In other words, was the attempt to perform a Tier-1 signature extraction in step 11 successful at extracting a QSG signature, meeting the statistical certainty level as specified by the user of method?

TABLE 1

Tiered forensic analysis scheme

| | Technique | Feature | Possible Signature Source | |
|---|---|---|---|---|
| Increasing Forensic Tier Level | LOM (exterior) | Device packaging | Dimensions, shape, markings | QSG signatures |
| | SEM (exterior) | Device packaging, leads | Markings, shape, texture, microstructure | |
| | XEDS and select other SCAS (exterior) | Device packaging, leads | Elemental composition | |
| | XRI | Lead frame | Shape, lead configuration | |
| | LOM (interior) | Die surface | Markings, global interconnections | |
| | SEM (interior) | Die surface, bonding wires | Markings, global interconnections, microstructure | |
| | XEDS and select other SCAS (interior) | Die surface, bonding wires | Elemental composition | |
| | XSEM (interior) | Cross section through die | Critical dimensions (CD) from BEOL and/or FEOL features | QSN signatures |
| | XTEM (interior) | Thin cross section through die | Critical dimensions (CD) from BEOL and/or FEOL features | |

For a given tier of analysis, if the step fails to extract useful signatures, the process will be repeated as the next tier of analysis in sequential iteration until a set of reliable signatures is extracted from the authentic part. Once a set of useful signatures is extracted, these comprise the reference If the extraction was successful, the method passes on to step 13, forensic analysis, which will be discussed in detail below.

If the extraction was not successful, then the method passes on to step 14, attempting the next tier extraction.

Step 13: If the extraction was successful, then a Forensic Analysis is performed, as will be discussed below with respect to the flowchart of FIG. 6.

Step 14: Attempt a Tier-2 Signature Extraction: the second attempt at extracting a QSG signature (also known as tier-2 signature extraction attempt) will be carried out.

Step 15: Was the Extraction Successful? In other words, was the attempt to perform a Tier-2 signature extraction in step 14 successful at extracting a QSG signature, meeting the statistical certainty level as specified by the user of method?

If the extraction was successful, the method passes on to step 13, forensic analysis, which will be discussed in detail below.

If not successful, then the process continues iteratively until a QSG or QSN signature is successfully extracted. For the purposes of this explanation, this is referred to as the "n-th" tier, step 17.

Step 17: Attempt a Tier-n Signature Extraction: the n-th attempt at extracting a QSG signature (also known as tier-n signature extraction attempt) will be carried out.

Step 18: Was the Extraction Successful? Yes, it was—by definition, the n-th tier is the tier at which the extraction was successful—so the method passes on to step 13, forensic analysis. There is no need in the flowchart to define a "no" branch.

Figure 6:
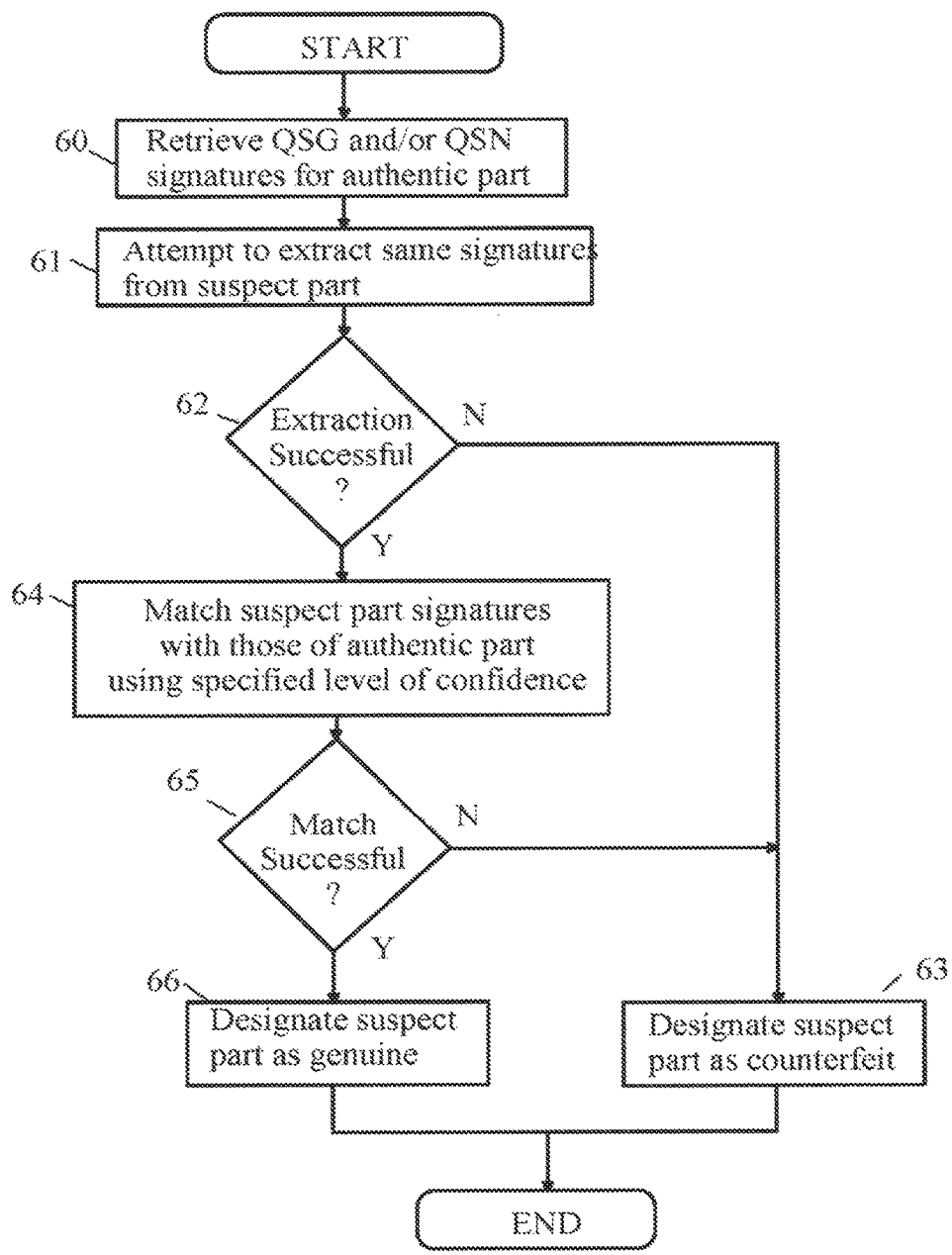
FIG. 6 shows a flowchart of a forensic analysis of a suspect part vs an authentic part.

FIG. 6 shows a flowchart of step 13 in FIG. 5, which details the method of forensic analysis of a suspect part vs an authentic part.

Step 60: Retrieve QSG and/or QSN signatures for a known authentic part, as detailed above in the discussion of FIG. 5.

If they exist in the authentic component, manufacturer specific QSGs signatures extracted by non-destructive analyses will be discovered. A reliable set of these signatures would be most desirable since it would confirm that such manufacturer specific QSG signatures could be extracted while leaving the reference authentic and suspect parts intact. Such a set would therefore likely represent a framework for the approach optimized for cost-effectiveness, high-throughput, results reliability and non-intrusiveness.

However, if such OSG signatures are not present or do not have the desired level of reliability, the option exists to proceed with the extraction of manufacturer specific QSN signatures by more invasive methods to demonstrate the concept. This will also indicate whether more invasive and necessarily destructive analysis is needed for the most reliable level of counterfeit detection by physical inspection methods.

These signatures, as discussed above, represent measurements of specific characteristics of the authentic component. For the purpose of this explanation, assume that there are four such signatures which are retrieved or extracted.

For the purposes of this example, assume that the component being analyzed is the CMOS device depicted in FIG. 4. The four locations 52a-52d in FIG. 4 are used to derive four signatures to be used in this example.

Step 61: Attempt to extract the same signatures from the suspect part as were extracted from the authentic part.

Step 62: Was the attempt at extraction of the signatures from the suspect part successful?

If the attempt was not successful, that means that the suspect component is sufficiently different from the authentic component that the points of comparison are not even present. Therefore, (step 63) the suspect part is designated as counterfeit, and the method ends.

Step 64: The signatures extracted from the suspect part are matched to the signatures extracted from the authentic part, using a specified level of confidence. This is shown graphically in this example in the graphs of FIGS. 7a-7d.

Figure 7A:
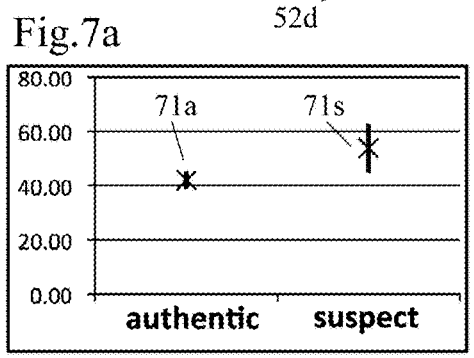
FIGS. 7a-7d show examples of graphs of parameters from an authentic component and a suspect component as might be used in the forensic analysis.

The graph in FIG. 7a shows a comparison of a signature extracted at point 52a in FIG. 4. The authentic part has a signature value 71a of 42, with a standard deviation (shown as an error bar) of 3. The suspect part has a signature value 71s of 54, with a standard deviation (shown as an error bar) of 9.

Figure 7B:
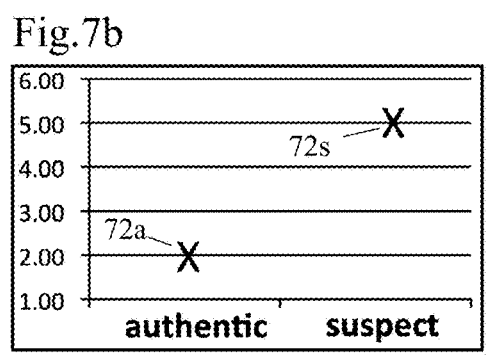

The graph in FIG. 7b shows a comparison of a signature extracted at point 52b in FIG. 4. The authentic part has a signature value 72a of 2, with a small standard deviation. The suspect part has a signature value 72s of 5, with a standard deviation of 1.

Figure 7C:
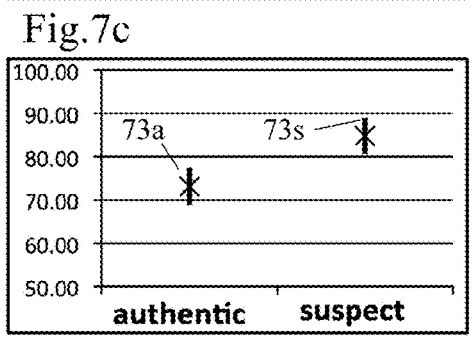

The graph in FIG. 7c shows a comparison of a signature extracted at point 52c in FIG. 4. The authentic part has a signature value 73a of 73, with a standard deviation of 4. The suspect part has a signature value 73s of 84, with a standard deviation of 4.

Figure 7D:
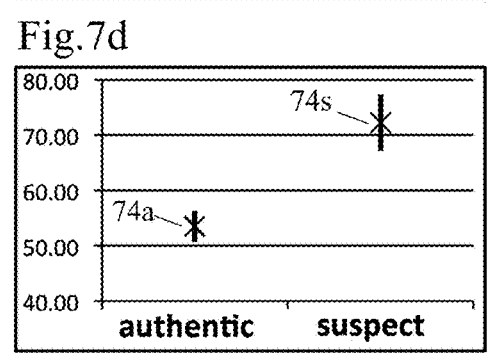

The graph in FIG. 7d shows a comparison of a signature extracted at point 52b in FIG. 4. The authentic part has a signature value 74a of 54, with a standard deviation of 3. The suspect part has a signature value 74s of 72, with a standard deviation of 5.

Step 65: Was the match successful? In the example shown in FIGS. 7a-7d and discussed above, the values of the extracted signatures do not overlap within a specified level of confidence (say, one standard deviation). Therefore, the match was not successful, and (step 63) the suspect component is declared as counterfeit, and the method ends.

If the match was successful, then (step 66) the suspect component is declared to be genuine, and the method ends.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of physically inspecting structural details of authentic integrated circuits (ICs) to a desired level of statistical certainty, among a plurality of levels of statistical certainty, to determine a unique signature of an IC, the method comprising:

selecting a desired statistical certainty level of authenticity among a plurality of statistical certainty levels of authenticity for an IC;

extracting structural details of an exterior of a set of ICs of the same type to determine a first level of structure details thereof, and if the first level of extracted structural details meets the selected level of statistical certainty, using the first level of structural details as a unique signature of the IC; otherwise extracting an external elemental composition of the set of ICs to determine a second level of structure details thereof, and if the second level of extracted structure details meets the selected level of statistical certainty, using the second level of structural details as the unique signature of the IC; otherwise extracting a configuration of an internal lead frame of the set of ICs to determine a third level of structure details thereof, and if the third level of extracted structure details meets the selected level of statistical certainty, using the third of structural details as the unique signature of the IC; and extracting global interconnections of the set of ICs to determine a fourth level of structural details thereof, and if the fourth level of extracted structure details meets the selected level of statistical certainty, using the fourth level of structural details as a unique signature of the IC; otherwise extracting a structural detail of a cross section of the set of ICs below the global level to determine a fifth level of structural details thereof, and if the fifth level of extracted structure details meets the selected level of statistical certainty, using the fifth level of structural details as a unique signature of the IC.

2. The method of claim 1, further comprising:
if the unique signature at the first level satisfies the selected level of statistical certainty, conducting a forensic comparison analysis on a suspect IC using the unique signature at the first level; otherwise
  if the unique signature of the second level satisfies the selected level of statistical certainty, conducting a forensic analysis on a suspect IC using the unique signature at the second level; otherwise
conducting a forensic analysis on a suspect IC using the unique signature of the third level.

3. The method of claim 1, further comprising:
if the unique signature at the first level satisfies the selected level of statistical certainty, conducting a forensic comparison analysis on a suspect IC using the unique signature at the first level; otherwise
  if the unique signature of the second level satisfies the selected level of statistical certainty, conducting a forensic analysis on a suspect IC using the unique signature at the second level; otherwise
  if the unique signature of the third level satisfies the selected level of statistical certainty, conducting a forensic analysis on a suspect IC using the unique signature at the third level; otherwise
  if the unique signature of the fourth level satisfies the selected level of statistical certainty, conducting a forensic analysis on a suspect IC using the unique signature at the fourth level; and
  if the unique signature of the fifth level satisfies the selected level of statistical certainty, conducting a forensic analysis on a suspect IC using the unique signature at the fifth level.

4. The method of claim 1, wherein:
the extracting of structural details of an exterior of a set of ICs of the same type to determine a first level of structure details thereof is performed by one of Light Optical Microscopy (LOM) examination or Scanning Electron Microscopy (SEM) examination of the packaging or leads of the ICs to determine at least one of dimensions, shape, markings, texture or microstructure of the packaging or leads of the IC.

5. The method of claim 4, wherein:
the extracting of an external elemental composition of the set of ICs to determine a second level of structure details thereof is performed by one of X-ray Energy Dispersive Spectroscopy (XEDS) or Surface Compositional Analysis Spectroscopy (SCAS) of the ICs to determine the elemental composition of the ICs packaging or leads.

6. The method of claim 5, wherein:
the extracting of a configuration of an internal lead frame of the set of ICs to determine a third level of structure details thereof is performed by X-Ray Imaging (XRI) of the lead frame to determine the shape or configuration thereof.

7. The method of claim 6, wherein:
the extracting of global interconnections of the set of ICs to determine a fourth level of structural details thereof is performed by one of Light Optical Microscopy (LOM) or Scanning Electron Microscopy (SEM) of the interior of the ICs to determine markings or global interconnections of the interior of the ICs.

8. The method of claim 7, wherein:
the extracting of the structural detail of a cross section below the global level of the set of ICs to determine a fifth level of structural details is performed by at least one of X-ray energy dispersive spectroscopy (XEDS) or Cross-sectional Scanning Electron Microscopy (XSEM) or High-Resolution Cross-sectional Transmission Electron Microscopy (HR-XTEM) of the cross section below the global level of the ICs to obtain elemental composition of the interior of the ICs or critical dimensions from the Back End of Line (BEOL) or Front End of Line (FEOL) multilayer interconnects physical structure of the ICs.

9. The method of claim 8, wherein:
the conducting of a forensic analysis on a suspect IC using the selected first through fifth levels of the unique signatures is performed by attempting to extract the same signatures from the suspect IC, and if the extraction is successful to the desired level of statistical certainty, designating the suspect IC as genuine, otherwise designating the suspect IC as counterfeit.

10. A method of inspecting structural details of authentic integrated circuit (IC) chips to a desired level of statistical certainty, to determine a unique structural identification of an IC chip the method comprising:
selecting a desired statistical certainty level of authenticity of an IC chip;
extracting structural details of an exterior physical structure of a set of IC chips of the same type to determine a first level of structure details thereof, and if the first level of structural details meets the selected statistical certainty level of authenticity, using the first level of structural details as a unique identification of the IC chip; otherwise
  extracting, sub sequentially, structural details of a global level, an intermediate level and a local level of the set of IC chip to determine sub sequential levels of structural details thereof until one of sub sequential levels of the structural detail of the IC chip meets the selected statistical certainty level of authenticity, and then using the level of structural details that meets the selected statistical certainty level of authenticity as the unique identification of the IC chip,
wherein the extracting structural details of a global level, an intermediate level and a local level of the set of IC chips includes extracting an internal microstructure thereof.

11. The method of claim 10, wherein the extracting structural details of a global level, an intermediate level and a local level of the set of IC chips includes extracting a cross-section through the die thereof.

* * * * *